United States Patent
Tigges

(10) Patent No.: US 8,783,314 B2
(45) Date of Patent: Jul. 22, 2014

(54) TIRE PRESSURE CONTROL SYSTEM HAVING ROTARY FEEDTHROUGH

(75) Inventor: Martin Tigges, Neuss (DE)

(73) Assignee: PTG Reifendruckregelsysteme GmbH, Neuss (DE)

( * ) Notice: Subject to any disclaimer, the term of this patent is extended or adjusted under 35 U.S.C. 154(b) by 0 days.

(21) Appl. No.: 13/820,964

(22) PCT Filed: Aug. 22, 2011

(86) PCT No.: PCT/EP2011/064365
§ 371 (c)(1),
(2), (4) Date: Mar. 13, 2013

(87) PCT Pub. No.: WO2012/031880
PCT Pub. Date: Mar. 15, 2012

(65) Prior Publication Data
US 2013/0167975 A1    Jul. 4, 2013

(30) Foreign Application Priority Data
Sep. 6, 2010  (DE) .................... 20 2010 008 453 U

(51) Int. Cl.
*B60C 23/00*    (2006.01)

(52) U.S. Cl.
CPC ...................................... *B60C 23/00* (2013.01)
USPC ........................................... 152/416; 141/38

(58) Field of Classification Search
CPC .......................................... B60C 23/00–23/004
USPC ..................................... 141/38; 152/415–417
See application file for complete search history.

(56) References Cited

U.S. PATENT DOCUMENTS

| 1,800,780 | A | 4/1931 | Daneel | |
|---|---|---|---|---|
| 2,418,730 | A * | 4/1947 | Schule | 152/417 |
| 6,363,985 | B1 * | 4/2002 | Beesley | 152/417 |
| 6,439,044 | B1 | 8/2002 | Tigges | |
| 6,510,882 | B1 | 1/2003 | Arvidsson et al. | |
| 7,287,565 | B2 * | 10/2007 | Hottebart et al. | 152/416 |
| 2005/0045259 | A1 * | 3/2005 | Hottebart et al. | 152/415 |
| 2009/0211682 | A1 * | 8/2009 | Sobotzik | 152/415 |
| 2013/0112327 | A1 | 5/2013 | Tigges | |

FOREIGN PATENT DOCUMENTS

| DE | 547256 | 3/1932 |
|---|---|---|
| DE | 827605 | 1/1952 |
| EP | 1095799 | 5/2001 |
| GB | 26685 | 0/1912 |
| WO | 00/15451 | 3/2000 |

OTHER PUBLICATIONS

International search report in international application No. PCT/EP2011/064365 mailed Nov. 28, 2011.
International preliminary report on patentability in international application No. PCT/EP2011/064365 mailed Mar. 7, 2013.

* cited by examiner

*Primary Examiner* — Gregory Huson
*Assistant Examiner* — Nicolas A Arnett
(74) *Attorney, Agent, or Firm* — Margaret Polson; Oppedahl Patent Law Firm, LLC

(57) ABSTRACT

The invention relates to a tire pressure control system for a motor vehicle, comprising a rotary feedthrough (7) having a stator and a rotor for transferring compressed air, fed from a compressed air source on the vehicle side to the rotor (R) designed for supporting a wheel. The rotary feedthrough (7) comprises an annular chamber (25) present between the rotor (R) and the stator (S) that can be sealed off by activatable seals (15, 16). A stator side and a rotor side air channel (8, 17) open into said chamber. The seals (15, 16) that can be activated for the purpose of compressed air transfer are disposed spaced apart in an axial arrangement having the same or approximately the same spacing from the rotary axis of the rotor (R). According to the invention, either the seals (15, 16) are designed for operating facing each other and an annular groove (18) present between the seals (15, 16) and open to the rotor (R) in the radial direction engages a rotor flange (19). The seals (15, 16) act against the opposite outer sides (20, 21) thereof when activated, for the purpose of sealing off the annular chamber. According to an alternative embodiment, the seals are designed to operate facing away from each other and the seals are disposed on a stator flange engaging in an annular groove and, when activated, act for the purpose of sealing the annular chamber against the groove walls of the rotor side annular groove, which are situated opposite one another. The part of the annular groove (18) sealed off by the activated seals (15, 16) in each case forms the annular chamber (25).

15 Claims, 2 Drawing Sheets

TIRE PRESSURE CONTROL SYSTEM HAVING ROTARY FEEDTHROUGH

BACKGROUND

The invention relates to a tire pressure control system for a motor vehicle, comprising a rotary feedthrough having a stator and a rotor for transferring compressed air, fed from a compressed air source on the vehicle side to the rotor designed for supporting a wheel, rotary feedthrough which comprises an annular chamber present between the rotor and the stator that can be sealed off by activatable seals, into which both a stator side and a rotor side channel open. The invention further relates to a feedthrough for a tire pressure control system.

Tire pressure control systems are used in motor vehicles, particularly in commercial vehicles such as trucks, tractors or earth moving machines, to allow the tire pressure in the tire to be adapted different operating situations of the motor vehicle. A desired adaptation of the tire pressure depends on the ground to be driven on and/or of the load. The footprint of the tire can be modified depending on the tire pressure. A tire has a larger footprint with a lower tire pressure than with a higher tire pressure. For this reason, it is preferable to drive with a lower tire pressure and with a larger footprint if the ground is soft than in the case of a consolidated road surface. The tire pressure can also be changed as a function of the given loading state.

Such tire pressure control systems comprise a rotary feedthrough to transfer compressed air from a vehicle side source to the rotatably mounted wheel to increase the inner tire pressure. The rotary feedthrough has a stator on the vehicle side and a rotor on the wheel side which separated from said stator by a movement gap. The stator and the rotor are arranged axially with respect to each other and with respect to the rotary axis of the wheel. The stator and the rotor have annular mutually opposite the movement slit for the transfer of compressed air, and mutually facing open grooves or chambers which are sealed off by activatable seals, as described in EP 1 095 799 B1, during the compressed air transfer in order to form a compressed air transfer chamber. On the wheel side, an air duct leading to the rim of the wheel is arranged on the rotor. Said air duct passes through an opening in the rim, and it opens into the tire interior. Typically, a controllable valve is inserted in the wheel side air duct. The valve is opened to regulate the tire pressure, and closed after the completion of the process. The pressurized air itself is provided by a compressor arranged on the vehicle side. Typically, the compressor that is present in any case in commercial vehicles for operating the braking system is used.

Increasingly, tire pressure control systems are also used in passenger cars. When such tire pressure control systems are used in passenger cars, problems arise due to the fact that, in contrast to commercial vehicles, there is very little installation space on or near the hub for a rotary feedthrough. In passenger cars tire pressure control installations are used primarily to provide an optimal tire pressure in each case, as a function of the loading, to achieve as optimal as possible a rolling motion of the wheel in terms of resistance to rolling to reduce the fuel consumption.

Although the tire pressure control system disclosed in EP 1 095 799 B1 can be used without problem in commercial vehicles, it is not sufficiently compact in its structure to be used in a passenger car. Moreover, due to rotors turning at higher rotation speeds in comparison to commercial motor vehicles, the seals applied against them undergo wear more rapidly. Due to the friction-caused heating in the case of activated seals, it can sometimes be necessary to apply an appropriately high pressure for the purpose of sealing off the compressed air transfer chamber.

On the basis of the discussed prior art, the invention therefore is based on the problem of improving a tire pressure control system of the type mentioned at the start, in such a manner that it can be installed even under the tight installation conditions of a passenger car and that it also meets the requirements placed on such a rotary feedthrough in a passenger car caused by the higher rotation speeds.

The foregoing example of the related art and limitations related therewith are intended to be illustrative and not exclusive. Other limitations of the related art will become apparent to those of skill in the art upon a reading of the specification and a study of the drawings.

SUMMARY

According to the invention, this problem is solved by a tire pressure control system in which, for the purposes of a compressed air transfer, activatable seals are disposed in an axial arrangement having the same or approximately the same radial spacing from the rotary axis of the rotor, and in which either the seals are designed to operate facing each other, and in which a rotor flange engages in an annular groove present between the seals and open to the rotor in the radial direction, against the opposite outer sides of which the seals act, for the purpose of sealing off the annular chamber, or in which the seals are designed to operate facing away from each other, and the seals are disposed on a stator flange engaging in an annular groove of the rotor, and, when activated, act, for the purpose of sealing off the annular chamber, against the groove walls of the rotor side annular groove, which are situated opposite each other, and the part of the annular groove which in each case is sealed off from the activated seals forms the annular chamber.

In contrast to the tire pressure control systems according to the prior art, in this tire pressure control system, the seals are positioned in an axial arrangement instead of in a radial arrangement with respect to each other. This means that the seals have the same or at least approximately the same radial spacing from the rotary axis of the rotor. Thus, on each one of the two seals of such a seal pair, the sealing face of the rotor that works together with said sealing pair acts with the same rotary speed. Accordingly, the two seals are subjected to the same heating and to the same wear. Due to the small installation space in the radial direction that it requires, the axial arrangement of the seals allows the rotary feedthrough, to be used even in motor vehicles having a small installation space in the area of the wheel or of the hub. Therefore, these tire pressure control systems and the associated rotary feedthroughs are particularly suitable for use in passenger cars.

There are two alternative designs for the formation of an annular chamber which the stator side and the rotor side air ducts open into, and through which, when sealed off, the transfer of the compressed air from the stator to the rotor occurs. The designs differ in the alignment of the direction of action of the seals and the resulting differences in the design of the rotary feed through. In the first embodiment, the seals are designed so that they operate facing each other. These seals act in an annular groove which is open in the radial direction toward the rotor. A rotor flange with parallel outer sides forming the faces against which the activated seals act is engaged in this annular groove. In this embodiment, the part of the annular groove which is sealed off by the activated seals forms the annular chamber, and the annular chamber is associated with the stator. In this design the activated seals act on the rotor flange like the brake linings on the disk of a disk brake.

In the second embodiment, the seals are designed so they operate facing away from each other. These seals are located on a stator flange, which in turn engages in an annular groove of the rotor. The activated seals act against the parallel walls of the rotor side annular groove. In this embodiment as well, the annular chamber is the part of the annular groove closed off by the activated seals, and the annular groove is associated with the rotor.

In both alternatives, the seals of a seal pair act on two mutually parallel faces of the rotor—in the first alternative design on the rotor flange, and in the second alternative design against the groove walls. Besides the small installation space required in the radial direction, this design has the advantage that the activation of the seals occurs neutrally with regard to a force introduction into the wheel bearing.

In the design of the described rotary feed through, it is particularly advantageous that it is possible to arrange two or more sealing arrangements located one after the other in the axial direction without requiring a larger installation space in the radial direction. This is required if the rotary feed through is to be designed with two or more channels. In these multi-channel designs, the compressed air is transferred for the inflation or deflating of the tire through one channel, and the control compressed air for the actuation of an actuator arranged on the rotor side is transferred through the other channel. Such a design can be implemented without problem even in the typically smaller available installation space in passenger cars.

A two-channel rotary feedthrough can be produced with three seals. This can be achieved if one channel is designed according to the above described first alternative and the second channel according to the above described second alternative. This design can be implemented with only three seals, because the interior seal between the two outer seals separates the annular spaces of the two channels from each other.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

Additional advantages and embodiments of the invention can be obtained from the following description of embodiment examples in reference to the appended drawings.

Figure 1:
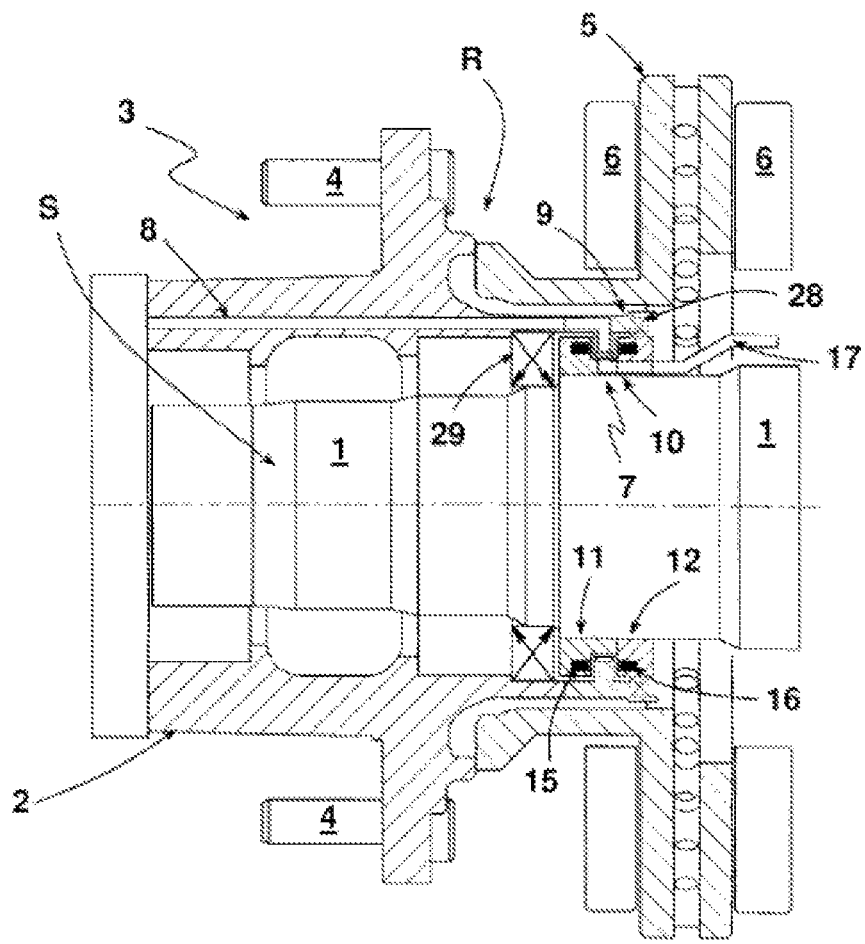
FIG. 1 is a longitudinal section through the wheel hub of a passenger car with a rotary feedthrough according to a first embodiment of a tire pressure control system.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

A motor vehicle, not represented in further detail, has a stub axle 1 which is connected to a drive shaft (not shown) A a wheel hub 2 is rotatably mounted on the stub axle 1. A wheel seat 3 having several wheel bolts 4 distributed over the circumference is located on the wheel hub 2. A brake disk 5 is connected to the wheel hub 3 mounted rotatably opposite the stub axle. The brake linings which work with the brake disk 5 are marked with the reference numeral 6 in FIG. 1.

The unit formed by the wheel hub 2 and the brake disk 5 forms a rotor R and is mounted opposite the stub axle 1 as stator S.

The motor vehicle is provided with a tire pressure control system which has a compressed air source on the vehicle side. A rotary feed through 7 for transferring the compressed air to the rotor R, is part of the tire pressure control system. The rotor R has an air channel 8 to receive the transferred compressed air. The air channel 8 is connected, in a manner not shown in further detail, to the interior of a tire mounted on a wheel arranged on the wheel seat 3. The rotary feed through 7 comprises an annular body 9 with T-shaped cross section and is connected to the stub axle-side end of the wheel hub 2 of the rotor R by means of plug bolts, screws or the like, in a manner not represented in further detail. A stator ring 10 which is rigidly attached to the outer side of the stub axle 1 is associated with the annular body 9 as a rotor part of the rotary feedthrough 7. The stator ring 10 of the depicted embodiment consists of two individual annular bodies 11, 12. Each of the annular bodies 11, 12 has a peripheral groove 13, 14 for one activatable annular seal 15, 16. The grooves 13, 14 are located at the same radial spacing from the rotary axis of the rotor R. The annular seals 15, 16 inserted in the grooves operate in facing directions. The stator ring 10 is connected to an air channel 17 which is diagrammatically represented. The air channel 17 is the air channel through which the compressed air is fed during tire inflation and is located on the vehicle side and thus the stator side. The air channel 17 is connected to a compressed air source which is not represented in further detail.

Figure 2:
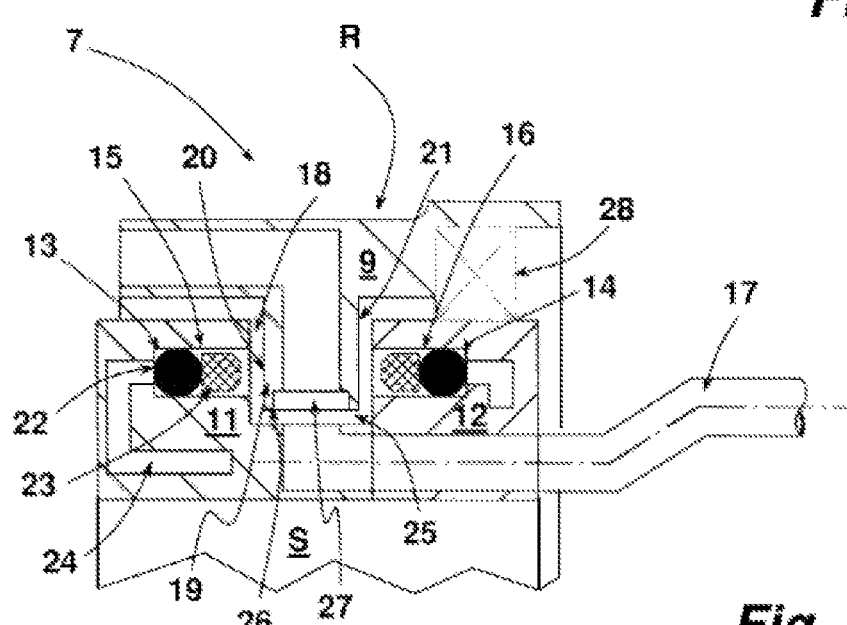
FIG. 2 is a detail of the rotary feed through of the tire pressure control system of FIG. 1 in an enlarged representation.

The rotary feedthrough 7 of FIG. 1 is shown again in an enlarged representation in FIG. 2 without the stub axle 1 and wheel hub 2. The two annular bodies 11, 12 of the stator ring 10 forms a circumferential annular groove 18 which is open in the radial direction toward the annular body 9 on the rotor side. The circumferential grooves 13, 14 for the seals 15, 16 are located in the parts of the stator ring 10 and together form the two mutually facing groove walls. The rotor side annular body 9 has a rotor flange 19 which extends into the annular groove 18. The two opposing, parallel outer sides 20, 21 of the rotor flange 19 form the rotor faces against which the activated seals 15, 16 act.

The seals 15, 16 are of identical design. Below, the seal 15 is described. The design of the seal 16 is the same. The seal 15 is arranged in the sealing groove 13 and the depicted embodiment comprises an adjusting ring 22 made of an elastomer material, which is sealed off in the radial direction and sits in the same groove. An O ring is used as the adjustment ring 22 in the depicted embodiment. In the depicted embodiment, a sliding ring 23 in the form of a Teflon ring located in the direction toward the rotor flange 19 constitutes an additional part of the seal 15. The sealing groove 13 is connected to a control line 24 which is in turn connected to a pneumatic control device in a manner not shown in further detail. If the control line 24 is exposed to pressure, the adjusting ring 22 is moved from its position shown in FIG. 2 in the direction of the rotor flange 19 and it pushes the sliding ring 23 against the outer side 20 of the rotor flange 19. As the sealing groove 14 is connected in parallel to the control line 24, the two seals 15, 16 are activated simultaneously. If the seals 15, 16 are activated, the lower section of the annular groove 18, which is directed toward the stator ring 10, is sealed off. This part of the annular groove 18 forms an annular chamber 25, through which the compressed air can be transferred from the stator ring 10 into the rotor body 9. The air channel 17 opens in the radial direction into the annular chamber 25 in the depicted example. The rotor side air channel 8 of the wheel hub 2 of the depicted embodiment of FIG. 1 has an axial extension and continues into the rotor body 9 and it opens after bending in the radial direction into the annular chamber 25. A collecting channel 27 extending circumferentially is pierced into the front face 26 of the rotor flange 19, which points into the annular groove 18. Said collecting channel has a rectangular cross-sectional surface in the depicted embodiment. The cross-sectional surface of the annular chamber 25 which is active for the purposes of the transfer of compressed air, is enlarged due to the circumferential collecting channel 27.

Instead of providing two-part seals, as described above, it is also possible to use single piece seals. The latter can be materially homogeneous or they can be designed as composite rings, for example, with a material combination of the described embodiment example.

For the purpose of transferring compressed air from the stator ring 10 to the rotor side annular body 9, the seals 15, 16 are activated, as a result of which the annular chamber 25 is sealed off with respect to the remaining sections of the annular groove 18 and thus with respect to the environment. Subsequently, the pressurized air is transferred from the vehicle into the tires of the wheel. After the compressed air transfer has occurred, the seals 15, 16 are deactivated, in particular by depressurizing the control line 24. The seals 15, 16 work like pliers with regard to the rotor flange, so that this does not lead to applying a load to the wheel bearing, as a result of the seals 15 or 16 being applied against the outer sides 20 or 21 due to the simultaneous and equal-force pressure application on the seals 15, 16. This is not inessential, since the control line 24 is definitely exposed to pressures of 3 bar or more in order to activate the seals 15, 16.

In order to prevent dirt from penetrating into the annular groove 18 from outside, the movement gap located between the rotor and the stator of the rotary feedthrough 7 is closed by corresponding dirt seals 28, 29 (see FIG. 1).

Figure 3:
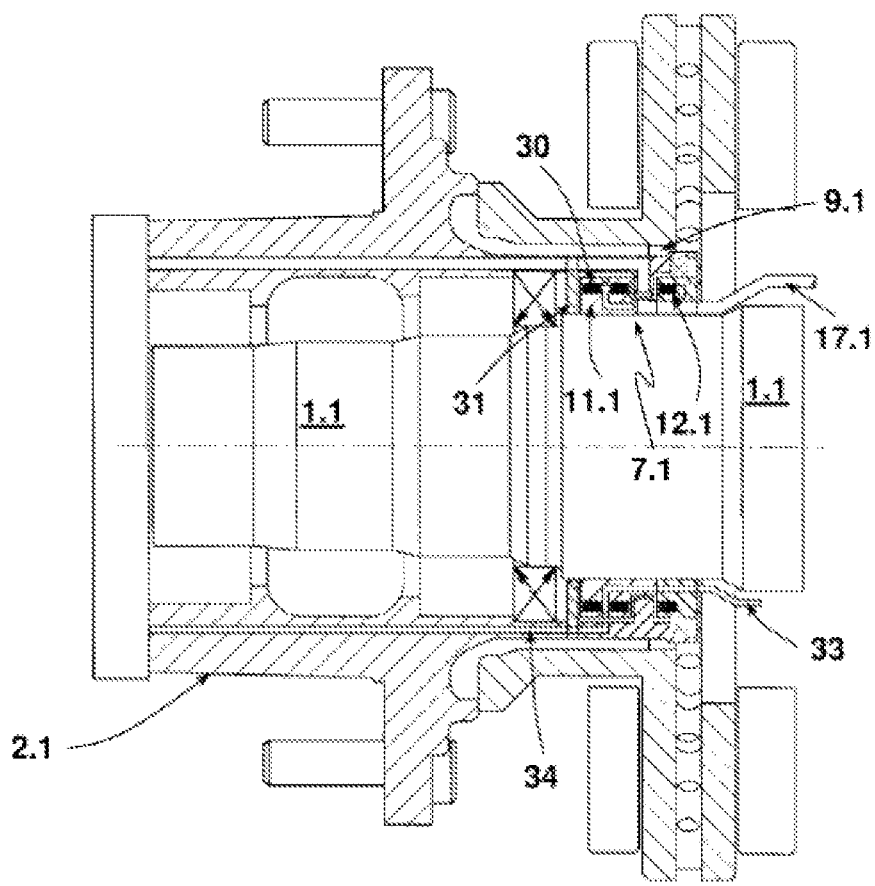
FIG. 3 is a longitudinal section through the wheel hub of a passenger car with a rotary feedthrough according to an additional embodiment of a tire pressure control system.
Figure 4:
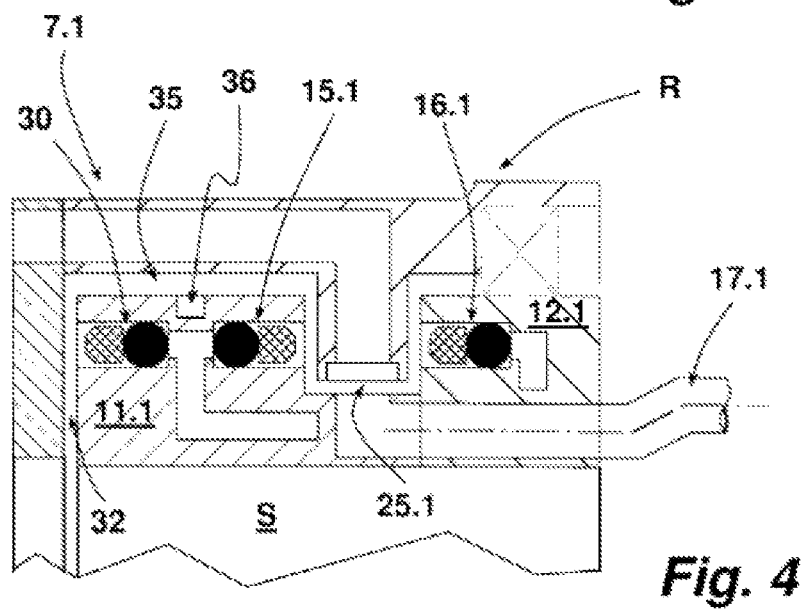
FIG. 4 is an enlarged representation of a detail of the rotary feed through of the tire pressure control system of FIG. 3.

FIG. 3 shows a wheel bearing arrangement, as shown in principle in FIG. 1, according to an additional embodiment of a rotary feedthrough of a tire pressure control system. The tire pressure control system of the embodiment example of FIG. 2 is designed with two channels. The first channel of the tire pressure control system operates as described above in reference to the embodiment example of FIG. 1. The second channel is a control channel for actuating an actuator associated with the wheel. It is possible to use a valve that can be activated appropriately to let air out of the tire interior. In FIGS. 3 and 4, elements that are identical to those already described in regard to the embodiment example of FIGS. 1 and 2 bear the same reference numerals with the addition of "0.1" for the purpose of simplifying the representation.

In FIG. 3, the rotary feedthrough 7.1 for the compressed air transfer for inflating a tire with its stator side air channel 17.1 is shown above the rotary axis. In contrast to the design of the annular body 11, the annular body 11.1 of the embodiment example of FIGS. 3 and 4, supports an additional seal 30 besides the seal 15.1. This seal is designed so that it operates facing away from to the seal 15.1. A second rotor flange 31 is used for the collaboration with the seal 30, against whose side facing the annular body 11, the seal 30, acts when actuated. Thus, the seals 15.1 and 30 are arranged in a stator flange which protrudes outward in the radial direction, and which dips in a circumferential annular groove 32 of the rotor body 9.1. A control line 33 opens into this annular groove 32 in the radial direction outside of the seals 15, 15.1. To receive a pneumatic control signal, the wheel hub 2.1 has a control channel 34. The latter leads to an actuator located on the wheel. The stator side control line 33 is connected to a pneumatic control device for controlling the actuator, in a manner which is not represented in further detail.

The rotary feedthrough 7.1 is represented again in an enlarged representation in FIG. 4. If the seals 15.1 and 30 are activated, then they seal off the radially outer part of the annular groove 32. This part of the annular groove 32 then forms the annular chamber 35 provided for the purposes of the transfer of compressed air. To increase the cross section of said annular chamber, a collecting channel 36 is produced in the radial outer side of the annular body 11.1. As can be seen in FIG. 3, the stator side control line 33 opens into said collecting channel, in particular in the radial direction. Similarly, the rotor side control channel 34 opens in the radial direction into the annular chamber 35 (see FIG. 3).

The seals 16.1, 15.1 and 30 of the rotary feedthrough 7 are connected parallel to a control line for the actuation of same. Therefore, the seals 16.1, 15.1 and 30 act simultaneously on the rotor faces associated in each case with them, with the same application pressure in each case. Thus, pneumatic control signals and compressed air can be transferred simultaneously from the vehicle to the wheel, so that an effective tire pressure control with a tire pressure reduction and a tire pressure increase is possible.

It is apparent from the represented embodiment example that the seals 15, 16 as well as 15.1, 16.1 as well as 15.1 and 30, which in each case act together in pairs, are in each case in an axial arrangement with respect to each other. They have the same radial spacing from the rotary axis of the wheel hub in each case. The described rotary feedthroughs clearly show that hardly any installation space is needed for the transfer of compressed air in the radial direction which is required for the tire pressure control.

The embodiment example of FIGS. 3 and 4 clearly shows that the seal 15.1 is used as an interior seal, located between the seals 16.1 and 30, for sealing off the two annular chambers 35, 25.1, and thus has a dual use.

It should be understood that, in the case of a rotary feedthrough with more than two channels, the arrangement shown in the axial direction in the embodiment example of FIGS. 3 and 4 can be repeated.

The arrangement of the seals 15, 16 or 15.1, 16.1 and 30 at only a slight spacing from the outer side of the stub axle 1 or 1.1 additionally clarifies that they can be positioned at a site where the effective rotary speed of the rotor side sealing faces or of those sections against which the seals act is relatively low, in comparison with positions of the seals where they are arranged at a greater radial spacing from the rotary axis.

There are numerous additional designs embodying the invention available to the person skilled in the art, which do not go beyond the scope of the claims, and which do not need to be presented further in detail.

LIST OF REFERENCE NUMERALS

1 Stub axle
2 Wheel hub

3 Wheel seat
4 Wheel bolt
5 Brake disk
6 Brake lining
7 Rotary feed through
8 Air channel
9 Annular body
10 Stator ring
11 Annular body
12 Annular body
13 Groove
14 Groove
15 Annular seal
16 Annular seal
17 Air channel
18 Annular groove
19 Rotor flange
20 Outer side
21 Outer side
22 Adjusting ring
23 Sliding ring
24 Control line
25 Annular chamber
26 Front face
27 Collecting channel
28 Dirt seal
29 Dirt seal
30 Seal
31 Rotor flange
32 Annular groove
33 Control line
34 Control channel
35 Annular chamber
36 Collecting channel
R Rotor
S Stator

The invention claimed is:

1. A tire pressure control system for a motor vehicle, comprising:
a rotary feed through having a stator and a rotor for transferring compressed air from a compressed air source on a vehicle side to the rotor, said rotor designed to support a wheel;
the rotary feed through further comprising an annular chamber located between the rotor and the stator, the annular chamber can be sealed off by activatable seals into which both a stator side and a rotor side air channel open;
the activatable seals can be activated for the purpose of compressed air transfer and are disposed spaced apart in an axial arrangement having approximately the same radial spacing from the rotary axis of the rotor;
an annular groove present between the activatable seals and open to the rotor in the radial direction which engages a rotor flange, said annular groove having opposite outer sides;
wherein the activatable seals operate facing each other and act against the opposite outer sides of the annular groove for the purpose of sealing off the annular chamber; and
the part of the annular groove is sealed off from the activated seals forms the annular chamber.

2. The tire pressure control system of claim 1 wherein the air channels are open in the radial direction into the annular chamber.

3. The tire pressure control system of claim 2 wherein the rotor flange comprises a peripheral collecting channel directed toward the foot of the annular groove of the stator and the rotor side air channel opening into the peripheral collecting channel.

4. The tire pressure control system according to claim 3 wherein the rotor side air channel opens in the radial direction into the collecting channel.

5. The tire pressure control system of claim 1 wherein the rotor flange is an annular body having a T-shaped cross section and having an axially aligned air channel section.

6. The tire pressure control system of claim 1, wherein each activatable seal comprises an adjusting ring arranged with a seal in an annular sealing groove and a sliding ring located before said adjusting ring in the direction of the outlet of the sealing groove.

7. The tire pressure control system of claim 1, wherein the rotary feed through has two channels, a first channel for transferring compressed air for tire inflation and a second channel for transferring control air for actuating an actuator associated with the rotor.

8. A tire pressure control system for a motor vehicle, comprising:
a rotary feed through having a stator and a rotor for transferring compressed air from a compressed air source on a vehicle side to the rotor, said rotor designed to support a wheel;
the rotary feed through further comprising an annular chamber located between the rotor and the stator, the annular chamber can be sealed off by activatable seals into which both a stator side and a rotor side air channel open;
the activatable seals can be activated for the purpose of compressed air transfer and are disposed spaced apart in an axial arrangement having approximately the same radial spacing from the rotary axis of the rotor;
the activatable seals are designed to operate facing away from each other, and are disposed on a stator flange engaging in an annular groove of the rotor and when activated for the purpose of sealing the annular chamber, act against groove walls of the rotor side annular groove which are situated opposite one another; and
the part of the annular groove is sealed off from the activated seals forms the annular chamber.

9. The tire pressure control system of claim 8 wherein the air channels are open in the radial direction into the annular chamber.

10. The tire pressure control system of claim 9 wherein the rotor flange comprises a peripheral collecting channel directed toward the foot of the annular groove of the stator and the rotor side air channel opening into the peripheral collecting channel.

11. The tire pressure control system according to claim 10 wherein the rotor side air channel opens in the radial direction into the collecting channel.

12. The tire pressure control system of claim 8 wherein the rotor flange is an annular body having a T-shaped cross section and having an axially aligned air channel section.

13. The tire pressure control system of claim 8, wherein each activatable seal comprises an adjusting ring arranged with a seal in an annular sealing groove and a sliding ring located before said adjusting ring in the direction of the outlet of the sealing groove.

14. The tire pressure control system of claim 8, wherein the rotary feed through has two channels, a first channel for transferring compressed air for tire inflation and a second channel for transferring control air for actuating an actuator associated with the rotor.

15. A tire pressure control system for a motor vehicle, comprising:
- a rotary feed through having a stator and a rotor for transferring compressed air from a compressed air source on a vehicle side to the rotor, said rotor designed to support a wheel;
- the rotary feed through further comprising an annular chamber located between the rotor and the stator, the annular chamber can be sealed off by activatable seals into which both a stator side and a rotor side air channel open;
- the activatable seals can be activated for the purpose of compressed air transfer and are disposed spaced apart in an axial arrangement having approximately the same radial spacing from the rotary axis of the rotor;
- the rotary feed through having two channels, a first channel for transferring compressed air for tire inflation and a second channel for transferring control air for actuating an actuator associated with the rotor;
- said first channel having an annular groove present between the activatable seals and open to the rotor in the radial direction which engages a rotor flange, said annular groove having opposite outer sides; wherein the activatable seals operate facing each other and act against the opposite outer sides of the annular groove for the purpose of sealing off the annular chamber;
- said second chamber having the activatable seals designed to operate facing away from each other, and are disposed on a stator flange engaging in an annular groove of the rotor and when activated for the purpose of sealing the annular chamber, act against groove walls of the rotor side annular groove which are situated opposite one another;
- the part of the annular groove is sealed off from the activated seals forms the annular chamber; and
- wherein the rotary feed through comprises, two exterior seals and one interior seal in an axial arrangement, the interior seal separates the annular chamber of the first channel and the second channel from each other when activated.

* * * * *